United States Patent

[11] 3,538,829

| [72] | Inventors | Karl Munnich;<br>Hans W. Minikes, Siegen, Germany |
|---|---|---|
| [21] | Appl. No. | 678,072 |
| [22] | Filed | Oct. 25, 1967 |
| [45] | Patented | Nov. 10, 1970 |
| [73] | Assignee | Eurograph Gesellschaft fur Photomechanik G.m.b.H.<br>Siegen, Germany<br>a corporation of Germany |
| [32] | Priority | Oct. 28, 1966 |
| [33] | | Germany |
| [31] | | M 71,480 |

[54] MACHINE FOR LOADING AND UNLOADING A CASSETTE WITH A PHOTOSENSITIVE SHEET
12 Claims, 11 Drawing Figs.

[52] U.S. Cl. ..................................................... 95/27,
355/76
[51] Int. Cl. ...................................................... G03b 19/10

[50] Field of Search ........................................... 355/72, 76;
95/27, 28, 29

[56] References Cited
UNITED STATES PATENTS
| 2,207,211 | 7/1940 | Worlatschek | 355/76 |
| 2,260,672 | 10/1941 | Johanson | 355/76 |
| 2,266,908 | 12/1941 | Rogers | 355/76 |

Primary Examiner—John M. Horan
Attorney—Olson, Trexler, Wolters & Bushnell

ABSTRACT: A machine having a rocking cassette holder which can be rocked to one position to receive a photosensitive sheet fed from a stack thereof, and which can be rocked to a second position to discharge an exposed photosensitive sheet from said cassette into a processing apparatus, the machine in one embodiment including means for exposing the photosensitive material with the cassette rocked to a third position.

Patented Nov. 10, 1970
3,538,829
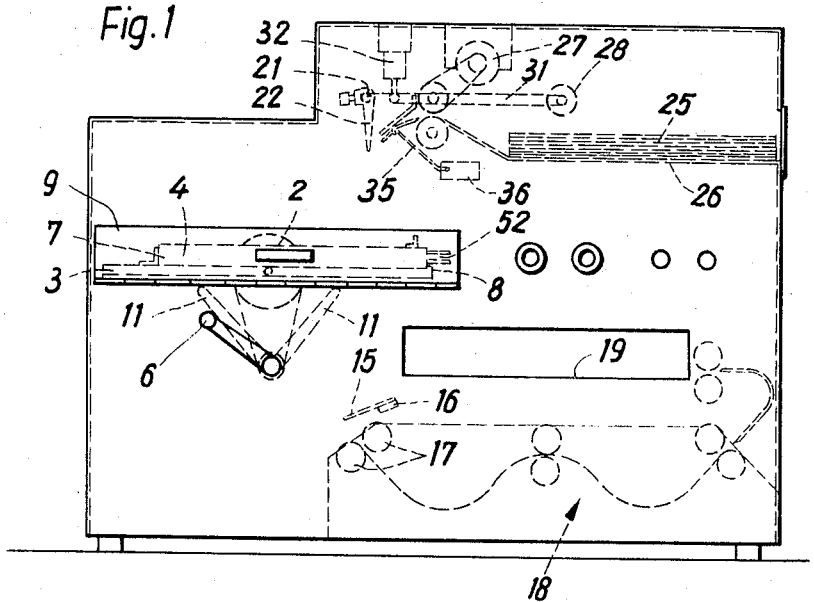
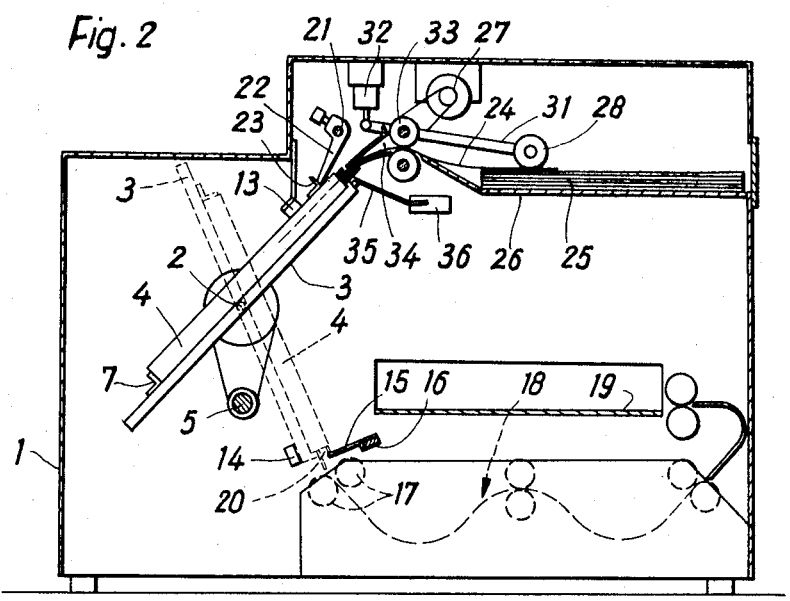
Inventors
Karl Münnich
H. W. Minikes
By: Olson, Trexler, Wolters & Bushnell attys

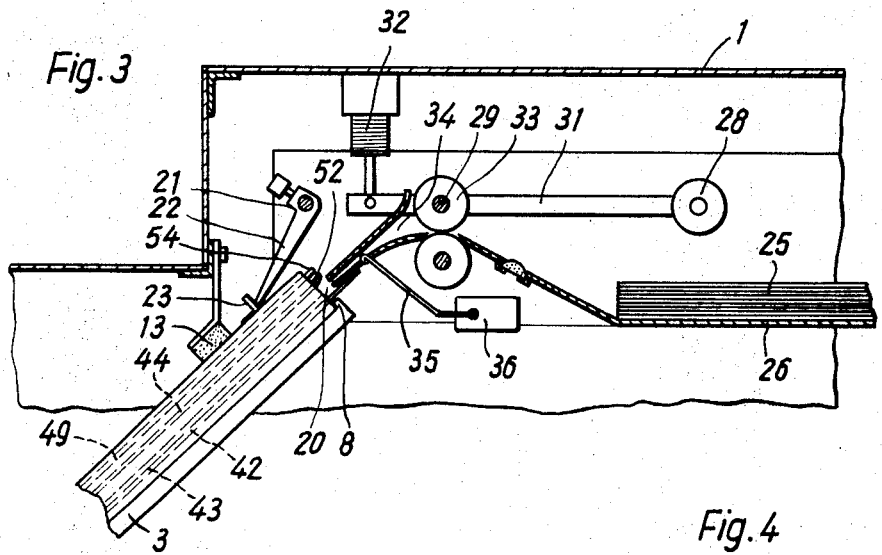
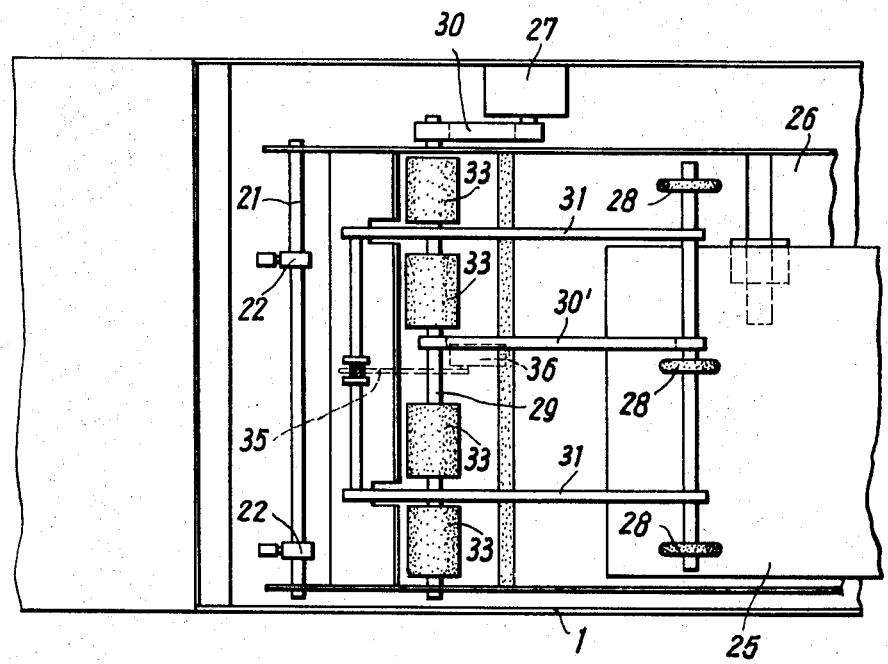

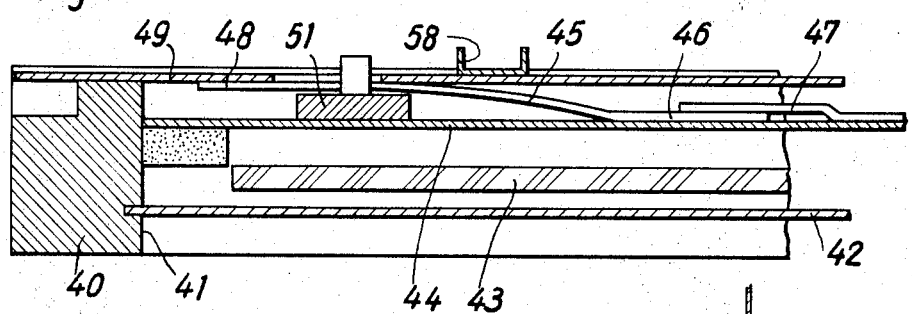
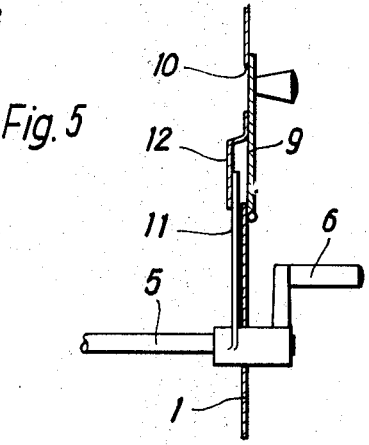
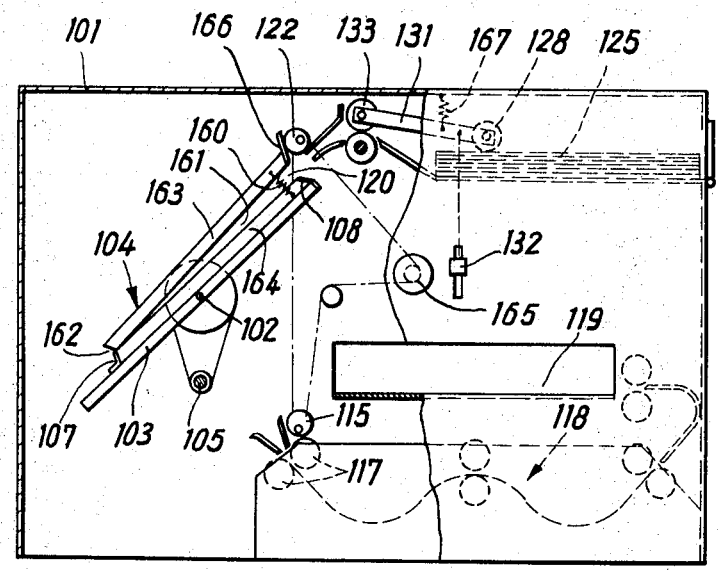

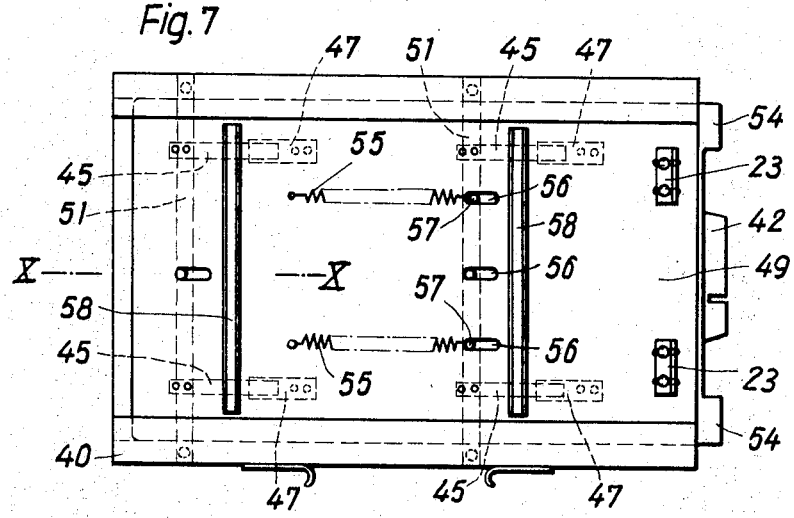
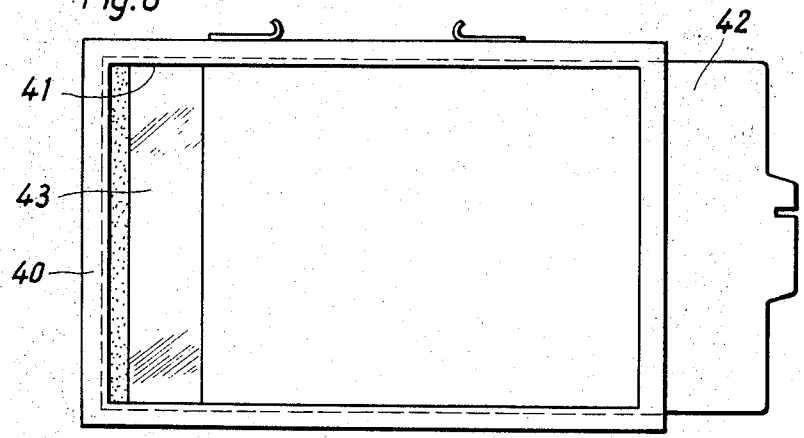
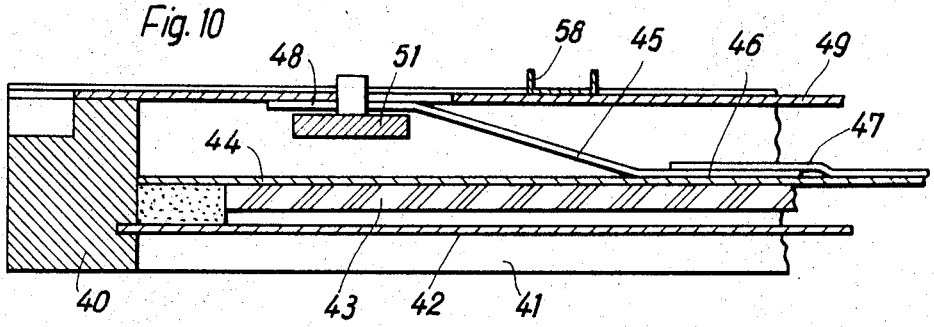

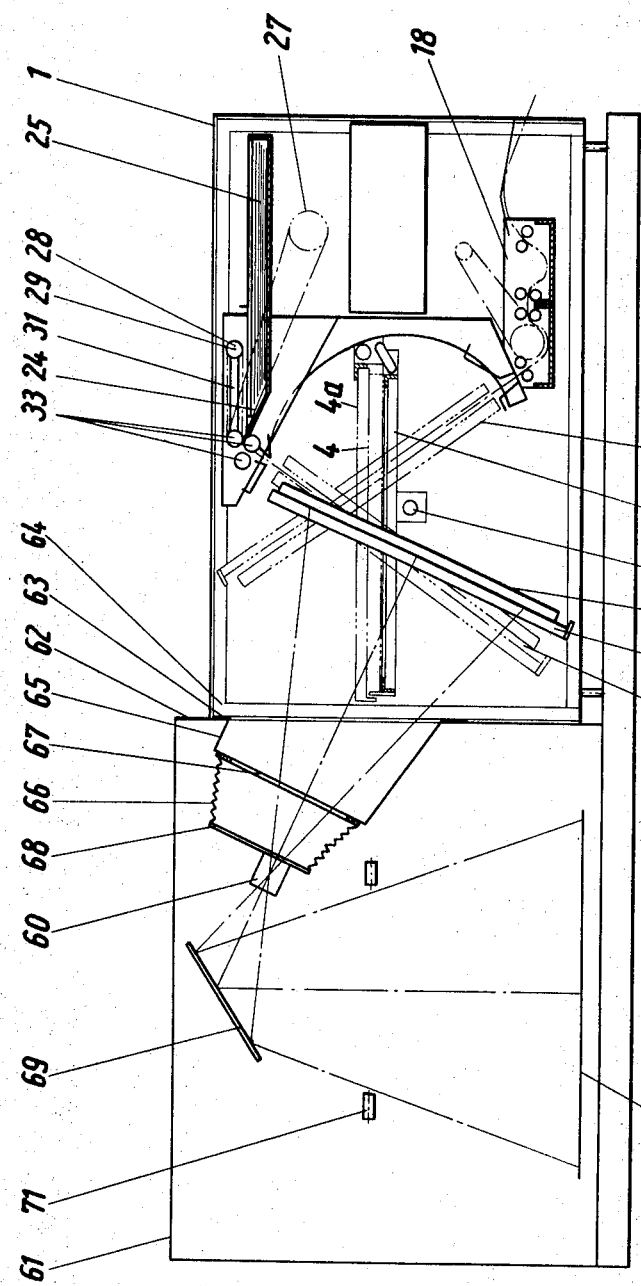

3,538,829

MACHINE FOR LOADING AND UNLOADING A CASSETTE WITH A PHOTOSENSITIVE SHEET

The invention relates to a machine for loading and unloading a cassette designed to carry a sheet of photographic material such as a copying sheet or an offset foil, which it is required to expose and to develop after exposure. For this purpose, known machines of this type include unloading means by which the sheet is removed from the cassette, and loading means by which the sheet is introduced into the cassette.

The invention provides a machine in which both loading and unloading can take place to a large extent automatically in successive operations, and in which according to a further development of the invention exposure of the photographic material can also be carried out.

The machine according to the invention is characterized by a cassette holder mounted in a housing so as to be pivotable about a substantially horizontal axis from a middle position into an inclined loading position and an oppositely inclined unloading position, by the unloading means being arranged below and the loading means above the cassette holder and by both comprising members which cooperate with the cassette when it is on the holder for the purpose of opening the cassette, so that when the cassette holder is in the two above-named positions the sheet slides under the action of gravity from the loading fitment into the cassette or from the cassette into the unloading fitment. The invention thus makes it possible in simple fashion for the cassette to be opened solely as a result of the pivoting movement of the cassette holder, the inclination of the cassette when the cassette holder is in the unloading position causing the sheet to slide automatically into the unloading means, whence it is then picked up and passed on, and, in the loading position, for the sheet, which has been fed to the cassette for example by an automatic feed device, to slide automatically into the cassette from the loading means.

When the cassette holder is in a middle position, it is preferably possible for the cassette to be inserted and removed through an aperture which can be closed by a cover.

The unloading means may include known developing means for developing the sheet taken from the cassette. If after loading the cassette with an unexposed sheet, the latter is taken from the machine introduced into an appliance for the purpose of exposure, for example a projector, an X-ray apparatus or the like, and returned therefrom to the machine after exposure without the cassette having to be opened, unloading and reloading of the cassette now takes place in the housing of the machine, the housing being closed after the cassette has been inserted, and there being no need to fear any accidental exposure. The sheet is developed immediately after unloading, so that the whole operation from removing a light-sensitive sheet from a supply stack up to developing always takes place inside a machine which prevents accidental exposure. As a result, handling of such a cassette is considerably simplified.

According to a further development of the invention, the exposure of the photographic may take place without the removal of the cassette from the machine; a wall of the housing of the machine parallel to the axis of the cassette holder may be at least partly replaced by exposure means, and the closed cassette can be pivoted into an exposure position in which the sheet is disposed in the image-plane of the exposure means. The replaceable wall is preferably the face of the housing opposite to the loading and unloading means which are arranged on one side of the cassette.

The invention also includes a cassette for the loading and unloading machine. The cassette may comprise a pressure-plate which presses the sheet against a glass plate, and a slide provided on the rear side of the cassette for the purpose of lifting the pressure-plate away from the glass plate, the said slide cooperating with the opening members in the unloading and loading fitment and lifting the pressure-plate away from the glass plate in an opening position displaced against the return force of a spring, one face of the cassette having a slot which when the pressure-plate is lifted constitutes an aperture for introducing or removing a sheet into and from the cassette.

However, the cassette may alternatively comprise two interlinked parts capable of being pivoted through an acute aperture angle against the force of springs, one of the said parts constituting the pressure-plate and the other carrying the glass plate, and an abutment for the opening member provided on the unloading and loading means at the edge of the pressure-plate opposite to the pivoting axis. The fact that both parts of the cassette need only be pivoted through an acute aperture angle upon opening means that no hinge is required either in this form of embodiment of the cassette or in the form of embodiment hereinbefore described, but in this case it is sufficient for the two parts of the cassette to be linked to one another by means of a flexible part, for example a steel spring, a rubberlike elastic strip of synthetic material or the like.

The invention will be more readily understood by way of example from the following description of loading and loading machines and cassettes therefor, reference being made to the accompanying drawings, in which FIG. 1 shows a lateral elevation of an example of embodiment of a machine for unloading and loading a cassette according to the invention, the cassette holder being illustrated in its middle position, FIG. 2 shows a longitudinal section through the device according to FIG. 1, with the cassette holder in the loading position, FIG. 3 shows a portion of FIG. 2, illustrated in enlarged form, before loading begins, FIG. 4 shows a plan view of the loading fitment illustrated in FIG. 3, FIG. 5 is a section through the wall of the housing of the device according to FIGS. 1 to 4 in the region of the cover for inserting and removing the cassette, FIG. 6 shows an illustration corresponding to FIG. 2 of a further example of the machine according to the invention, FIGS. 7 and 8 show elevations of the rear and front sides of a cassette for the machine of FIGS. 1 to 5, FIGS. 9 and 10 are sections along the line X-X in FIG. 7 with the cassette open and closed respectively; and FIG. 11 shows a modified and further developed form of machine of the invention, in a view corresponding to that of FIG. 2.

The machine illustrated in FIGS. 1 to 5 comprises a housing, designated as a whole by 1, in which a holder 3 for a cassette 4 is mounted so as to be pivotable about a horizontal shaft 2. For this purpose, the holder 3 is fast with the shaft 2 and can be pivoted, by means of a cord drive from a shaft 5 which extend through the housing 1 and carries a handcrank 6 outside the housing. The holder 3 can turn from the central position illustrated in FIG. 1 into the inclined unloading position illustrated in broken line in FIG. 2 and into the oppositely inclined loading position illustrated in full line in FIGS. 2 and 3.

The cassette holder 3 carries abutments 7 and 8 between which the cassette 4 can be pushed through an aperture 10 in the housing wall when the cassette holder 3 disposed in the middle position. The aperture 10 can be closed by a cover 9 which is arranged to be opened only when the cassette holder is in the middle position. For this purpose, the shaft 5 is linked to a bolt 11 which engages behind a flap 12 linked to the cover 9 when the cassette holder is not in the central position, as illustrated in FIG. 5.

In order to determine the two inclined end positions of the cassette holder 3, a resilient abutment 13 for the cassette 4 in the loading position is mounted off the housing 1; a similar abutment 14 similarly limits clockwise movement of the carrier 3 to determine the unloading position. In addition, a plate-shaped abutment 15 at the unloading position is secured to a strap 16 fast with the housing 1 to engage a part of the cassette 4 shortly before the unloading position is reached, as more fully described hereinafter; when the cassette holder is further pivoted into the unloading position, the cassette part is so displaced that a gap 20 opens on the then downwardly pointing narrow face of the cassette, so that the exposed sheet in the cassette can slide under the action of its own weight out of the gap 20 and in between the feed rollers 17 of a known developer 18. The feed rollers 17 convey the sheet into the developer, through which it then passes automatically in known manner, and is conveyed to a delivery platform 19 which is also inside the housing 1.

In the loading position, there are a pair of abutment arms 22, which are pivotable about a spindle 21, and which cooperate with two abutments 23 on the above mentioned displaceable part of the cassette 4. The abutments 23 come to bear against the abutment arms 22 shortly before the loading position is reached, and, when the cassette holder 3 is further pivoted into the loading position, the abutments 23 are displaced by these abutment arms 22 to open the gap 20 for the introduction of an unexposed sheet 24. For this purpose, known means for storing and conveying the sheets 24 in a stack of sheets 25, made in the form of a loading device is provided above the cassette holder 3, and comprises a platform 26 for the stack of sheets 25 and rollers 28 which are driven by an electric motor 27, and which are mounted on a frame 31 capable of being pivoted about a shaft 29. The rollers 28 are driven from the motor 27 via belts 30 and 30'; the drive expediently remains continuously engaged, and the rollers 28 are only briefly pressed against the topmost sheet 24 in the stack 25 with the aid of the electromagnet 32 until that top sheet is introduced between the conveyor rollers 33. In this connection, the electromagnet 32 may be automatically actuated by pivoting of the cassette holder 3 into a loading position. Immediately at the outlet of the introduction slot 34 there is furthermore a feeler 35 of a microswitch 36 which indicates when a sheet 24 has slid into the cassette 4 after leaving the conveyor rollers 33, and when the cassette holder 3 may be pivoted from the loading position into the middle position for the purpose of removing the cassette.

FIG. 11 shows a form of embodiment of the invention further developed by the addition of an exposure device, all parts not essential here having been omitted. In the housing 1, the exposure cassette 4 on the holder 3 can be pivoted not only into the horizontal position 4a for removing the cassette illustrated in dash-dotted line, in which position the cassette can be removed from the housing through a lateral aperture (not illustrated) if it is intended to expose the filled cassette externally, and into the loading and unloading positions 4b and 4c in which the cassette is opened, but furthermore into a fourth position 4d in which the cassette 4 can be locked by a detent fitment or the like, and is in closed state just as in the position for removal. It is to be understood that when the device is being operated with the additional appliance according to the invention as illustrated in FIG. 11 the cassette 4 does not carry a sheet of metal covering its glass plate in light-tight fashion.

In position 4d, the cassette 4 is disposed in the image-plane of an optical system 60 which is part of the exposure device more precisely described hereinafter.

The housing 61 of the exposure device has a lateral wall 62 which can be moved up to the housing 1 or fastened thereto by means of angled connector pieces 63 or the like. The wall 62 then takes the place of a lateral wall detachably fastened to the housing 1, for example to the angles 64 of the frame.

From the lateral wall 62 of the housing 61, a tube 65 extends into the said housing, a bellows 66 being fastened round the front aperture 67 of the tube. The optical system 60 already mentioned is fitted to the front plate 68 of the bellows 66.

A deflector mirror 69 is furthermore arranged in the housing 61 so as to deflect the rays emanating from the exposure surface 70 into the optical system 60. The extension-board disposed on the exposure surface 70 is illuminated for example by quartz-iodine lamps 71 which are also arranged within the housing 61.

The cassette 4 for use with the loading and unloading machines of FIGS. 1 to 5 and 11 is illustrated in FIGS. 7 to 10. The cassette comprises a frame 40 in which a glass plate 43 is rigidly mounted and a sheet metal cover 42 for the exposure aperture 41 is guided. A pressure-plate 44 bears against the rear side of the glass plate 43, and is pressed against that plate by leaf-springs 45. The bent leaf-springs 45 engage at one end 46 in pockets 47 formed on the pressure-plate 44. The other ends 48 of the leaf-springs 45 are fastened with a slide 49 which is displaceably guided on the rear side of the frame 40, and which can be displaced from the closed position of the cassette illustrated in FIG. 10 into the open position of the cassette illustrated in FIG. 9.

Immediately below the bent ends 48 of the leaf-springs 45 there are straps 51, fast with the frame 40, which together with the slide 49 form slots corresponding approximately to the thickness of the leaf-springs 45, and immediately adjoin the middle parts of the springs 45 which are at an angle to the ends 46 and 48 thereof. In this connection, the springs 45 are so sharply bent that in the closed position illustrated in FIG. 10 the pressure-plate 44 is pressed against the glass plate 43 by the springs 45. However, if the slide 49 is displaced into the position illustrated in FIG. 9, the middle parts of the leaf-springs 45 are pulled into the gaps bounded by the straps 51, and as a result the pressure-plate 44 is lifted away from the glass plate 43. On one narrow face of the cassette 4 forming the opening gap 20 there is a slot 52 through which the edge of the pressure-plate 44 forming a run-in lip projects somewhat from the cassette. As long as the pressure-plate 44 lies on the glass plate 43, it provides an externally light-tight closure for the space between the first slide 42 and the pressure-plate 44. However, as soon as the pressure-plate 44 is lifted away from the glass plate 43, the introduction and removal gap 20 of the cassette opens, so that a sheet 24 may be introduced into the cassette when the cassette holder 3 is in the loading position, or let out of the cassette when the cassette holder 3 is in the unloading position. Projections 54 and the abutments 23 are provided on the slide 49 for the purpose of cooperating with the abutment 15 and the abutment arms 22. In order to hold the slide 49 in its closed position in resiliently yielding fashion, there are return springs 55 linked at one end to the slide 49 and at the other end to pins 57 which are fastened to a strap 51 fast with the frame, and which engage through slots 56 in the slide 49. The slide 49 is provided on its external surface with stiffening profiles 58 in order to prevent it from bending as a result of the force of the springs 45.

The mode of action of the machine illustrated in FIGS. 1 to 5 and of the cassette illustrated in FIGS. 7 to 10 follows very simply from the foregoing description. If the cassette holder 3 is rotated by the handcrank 6 into its central position, the cover 9 can be opened, and the cassette loaded in a previous operation can be removed. A new cassette with an exposed sheet is then placed in position on the cassette holder 3 through the aperture 10 between the abutments 7 and 8 with the rear side upwards. The cover 9 is then closed, and the handcrank 6 is actuated in such a manner that the cassette holder is moved into the unloading position illustrated in broken line in FIG. 2. As movement into this position takes place, the abutment 15 comes to bear against the projections 54 on the second cassette slide 49, so that the latter is displaced into its opening position when the cassette holder 3 is further pivoted into the unloading end position, with the result that the pressure-plate 44 lifts away from the glass plate 43. As a result, the exposed sheet clamped between the pressure-plate 44 and the glass plate 43 is released, and slides through the gap 20 in between the feed rollers 17 of the developer 18, where the sheet is immediately developed, and after development conveyed to the platform 19. The cassette holder 3 is then pivoted by means of the handcrank 6 into the loading position. Shortly before it reaches this position, the abutment arms 22 come to bear against the abutments 23, so that as the cassette holder 3 is further pivoted the gap 20 is opened again in the manner described above. When the cassette holder 3 reaches its end position, the electromagnet 32 may be briefly actuated, either automatically or by means of a switch, so that as a result the topmost sheet 24 of the stack 25 is introduced into the gap 20 in the cassette 4. As soon as the sheet 24 releases the feeler 35 of the microswitch 36, a signal is given to the operator that the cassette holder 3 may now be moved into its central position and the cassette 4 removed from the machine, or in the case of the device according to FIG. 11 the cassette holder may be moved into the exposure position 4d.

A slightly modified example of embodiment of a loading and unloading machine according to the invention is illustrated in FIG. 6. All parts corresponding in their mode of action to the parts of the examples of embodiment hereinbefore described are designated by corresponding reference numbers increased by 100. The difference as compared to the example of embodiment hereinbefore described resides on the one hand in the design of the cassette 104, which here consists of two interlinked parts 163 and 164 which are pivotable against the force of springs 160 through an acute aperture angle 161 about an axis 162 opposite to the introduction gap 120, one part carrying the pressure-plate, not illustrated in the drawing, and the other part 164 carrying the exposure slide and the glass plate. The pivoting axis 162 may take the form of a flexible strip of a flexible material, not illustrated in the drawing.

Cam-discs 115 and 122, which cooperate with a projecting edge 166 on the part 163 of the cassette and which are driven by a common drive 165 by means of a chain, cord, belt or the like, are provided for the purpose of opening the cassette 104 in the unloading position and in the loading position. This ensures that the cassette is not opened until the drive 165 is actuated in such a manner that the cam-discs 115 and 122 move into the position in which by abutting against the projecting edge 166 of the cassette they lift the part 163 away from the part 164 against the force of the springs 160. In this connection, the drive 165 may be actuated manually by a handle, or automatically in a fully automatic machine. In order to pivot the rollers 128 in order to pull the topmost sheet from the stack 125, the machine is provided with a handle 132, capable of manual actuation, by means of which the frame 131 can be pivoted against the force of a return spring 167 into the working position illustrated in FIG. 6. In the case of this example of embodiment of the machine, the abutments 107 and 108 must be so designed that the lower part 164 of the cassette cannot be lifted away from the cassette holder 103 by the cams 115 or 122.

The mode of action of the example of embodiment according to FIG. 6 otherwise corresponds essentially to the mode of action of the example of embodiment hereinbefore described.

I claim:

1. In a machine for loading and unloading a cassette for a sheet of photographic material which it is required to expose and to develop after exposure, comprising loading means for introducing a sheet into the cassette and unloading means for removing the sheet from the cassette, the improvement comprising, a housing, a cassette holder pivotally mounted in said housing about a substantially horizontal axis for movement from a middle position into an inclined loading position and an oppositely inclined unloading position, said unloading means being arranged below and said loading means above said cassette holder, and members included in said loading and unloading means cooperating with the cassette when it is on said holder for the purpose of opening the cassette, whereby when said cassette holder is in said loading position the sheet slides under the action of gravity from the loading means into the cassette and, when in said unloading position said sheet slides under gravity from the cassette into the unloading means.

2. A machine according to claim 1, in which said loading means and said unloading means comprise conveyor means for introducing or removing a sheet into or from the cassette.

3. A machine according to claim 2, in which said unloading means includes developing means for developing the sheet taken from the cassette.

4. A machine according to claim 1, in which said members for opening the cassette when the cassette holder is in the loading and unloading positions are in the form of abutments which cooperate with a part of the cassette, and which are so arranged that said cooperating part of the cassette comes to bear against the relevant abutment before the cassette holder has reached its relevant end position, and the movement of said part of the cassette caused by the cassette holder being further pivoted into the end position opens the cassette.

5. A machine according to claim 1, in which said cassette holder has a middle position in which said cassette may be inserted and removed through an aperture in said housing closeable by a cover.

6. A machine according to claim 1, in which said cassette holder has a middle position in which said cassette may be inserted and removed through an aperture in said housing closeable by a cover including a bolt capable of being pivoted with the cassette holder for the purpose of locking said cover, and releasing said cover only when the cassette holder is in said middle position.

7. A machine according to claim 1, in which a wall of said housing parallel to said axis of the cassette holder carries exposure means, and the cassette holder is pivotable into an exposure position in which the sheet is disposed in the image-plane of the exposure means.

8. A machine according to claim 1, in which a wall of said housing parallel to said axis of the cassette holder carries exposure means, and the cassette holder is pivotable into an exposure position in which the sheet is disposed in the image-plane of the exposure means characterized in that said wall is the face of the housing opposite to the loading and unloading means arranged on one side of the cassette.

9. A machine according to claim 1, in which a wall of said housing parallel to said axis of the cassette holder carries exposure means, and the cassette holder is pivotable into an exposure position in which the sheet is disposed in the image-plane of the exposure means characterized in that the exposure means comprises an optical system held via a bellows on a tube forming part of said wall.

10. A machine according to claim 1, in which a wall of said housing parallel to said axis of the cassette holder carries exposure means, and the cassette holder is pivotable into an exposure position in which the sheet is disposed in the image-plane of the exposure means characterized in that the exposure means comprises an optical system held via a bellows on a tube forming part of said wall in which said wall also constitutes a part of an additional housing surrounding said exposure means.

11. A machine according to claim 1, in which a wall of said housing parallel to said axis of the cassette holder carries exposure means, and the cassette holder is pivotable into an exposure position in which the sheet is disposed in the image-plane of the exposure means characterized in that the exposure means comprises an optical system held via a bellows on a tube forming part of said wall in which said wall also constitutes a part of an additional housing surrounding said exposure means including a deflector mirror and lighting appliances arranged in said additional housing.

12. A machine according to claim 1, in which a wall of said housing parallel to said axis of the cassette holder carries exposure means, and the cassette holder is pivotable into an exposure position in which the sheet is disposed in the image-plane of the exposure means including means for locking said cassette holder in said exposure position.